May 9, 1950 L. WIDMER 2,507,361
RADIAL FLUID MOTOR WITH SWINGING CYLINDERS AND PISTONS
Filed July 24, 1946
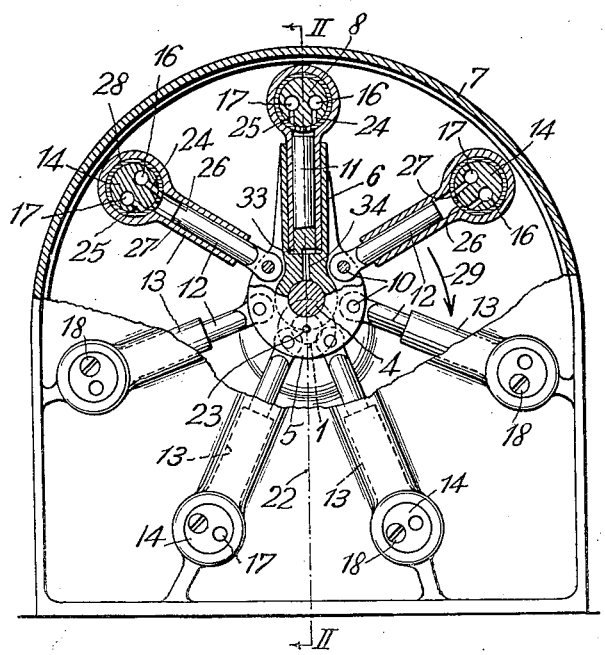
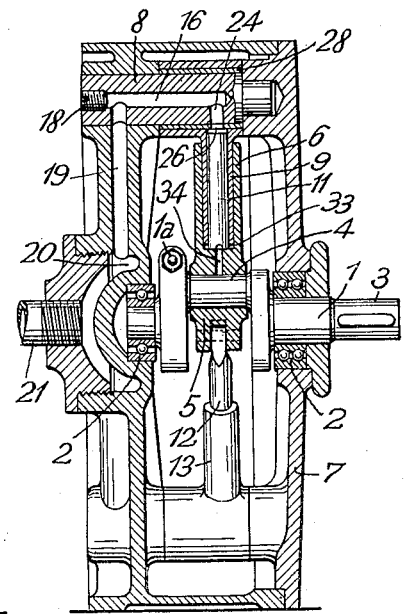
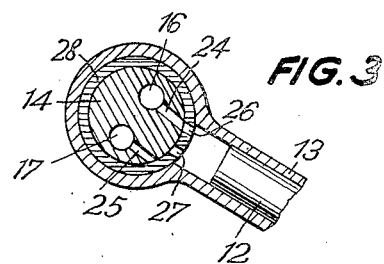
INVENTOR:
Leo Widmer
by Sommers & Young
Attorneys Patented May 9, 1950

2,507,361

UNITED STATES PATENT OFFICE 2,507,361

RADIAL FLUID MOTOR WITH SWINGING CYLINDERS AND PISTONS

Leo Widmer, Feldbach-Zurich, Switzerland, assignor to Schweizerische Lokomotiv und Maschinenfabrik, Winterthur, Switzerland Application July 24, 1946, Serial No. 686,027
In Switzerland March 9, 1946

1 Claim. (Cl. 121—65)

My present invention relates to improvements in radial fluid motors with swinging cylinders and pistons.

One embodiment of my present invention is illustrated in the accompanying drawing, in which:

Fig. 1 shows said embodiment, the top portion in cross-section, and the bottom portion in elevation, Fig. 2 an axial section on line II—II of Fig. 1, and Fig. 3 a detail in a greater scale.

The crankshaft 1, mounted in ball bearings 2 in the stationary case 7, from the end 3 of which the torque of the liquid-motor is derived, is provided with a crank pin 4. A connecting-rod spider 5, adapted similar to the master connecting rod of a radial motor, is journaled on the crank pin 4. In order to permit of making the spider 5 integral, the crank shaft 1, in known manner, is made of two parts which are held together by the screw 1a. The spider 5 is provided with an extension 6 having a radial bore in which a cylinder 9 is slidably guided. The latter is pivoted or hinged on a stud 8 secured to the stationary case 7, and houses a filling piston 11 which with its inner end abuts against the bottom of the cylinder chamber formed by the guide 6. The said piston may be fastly secured to the spider 5. In order to prevent the damming up of oil in the annular space 33, a bore 34 communicating with the crank pin 4 through a radial groove in the bottom face of the filling piston 11 is provided for, by which arrangement the crank pin 4 may be lubricated. Six identical pistons 12 are pivoted on the studs 10 on the spider 5, and are guided in the six associated cylinders 13 which in their turn are pivoted on the six studs 14 of the stationary case 7. The studs 14 are of the same design as the said stud 8 of the cylinder 9. All of the studs 14, 8 are provided with two laterally spaced bores 16 and 17, one of which, 16, is plugged at its end by a grub screw 18 and communicates with an annular chamber 20 through a radial passage 19 provided in the stationary case 7, and the said chamber 20 may be supplied from the outside with pressure liquid through the port 21. The other axial bore 17 in the studs 14, 8, however, is open to the outside. The two bores 16, 17 at their other end are provided with passages 24 and 25 each, pointing approximately in the radial direction toward the case center 23 and which, together with the apertures 26 and 27 in the bushings 28 (Fig. 3) fastly secured to the cylinders 9 and 13, control the supply and discharge of the liquid to and from the latter.

Since the cylinder 9 is at dead center, the two radial passages 24 and 25 in the stud 8 thereof are masked by the bushing 28. In the cylinder 13 to the left of cylinder 9, however, the radial passage 24 communicates with the aperture 26 in the bushing so that this cylinder 13, as well as all of the cylinders 13 situated to the left of the vertical center line 22, is supplied with pressure-liquid through its axial bore 16. The radial passage 25 in all of such cylinders 13 is closed by the bushing 28 so that no liquid is capable of flowing out of the cylinders. Similarly, in the crank position shown, the outlet passages 25, 17 in all of the cylinders 13 situated to the right of the vertical center line 22, communicate with the cylinder inner space through the apertures 27, and enable the liquid to flow out therefrom. It is readily seen that the crankshaft 1, 3, 4 rotates in the direction of arrow 29 under the action of the pressure-liquid.

It is to be noted that all the seven pistons shown, i. e., the six pistons 12 and the filler piston 11, perform useful work, since piston 11 only serves for diminishing the deleterious clearance, and its appurtenant cylinder operates just like any of the six cylinders 13. Further, the web intermediate of bores 26 and 27 in bush 28 (Fig. 3) may be removed and the said two bores combined into a single one, without changing the mode of operation in any way whatever. Finally, such single bore or two bores 26, 27 do not have to be provided in a bush 28, as the cylinders also could be mounted directly onto the studs 8, 14. In such latter case, the single bore 26 or the two bores 26, 27 would be provided in the cylinder bottom itself. Such bores, further, also could be provided in form of slots.

The motor also may be driven by air or any other gas.

What I claim and desire to secure by Letters Patent is:

A radial fluid motor of the swinging cylinder and piston type, comprising a stationary casing and a central crank shaft having a crank pin, cylinders pivoted respectively on fixed studs connected to said casing, a port-type timing-gear provided in each cylinder-and-stud unit for supplying and discharging the operating fluid to and from the respective cylinder spaces, a spider rotatably mounted on the crank shaft, a plurality of pistons all, except one, of which are pivotally connected to said spider, a radial extension provided on said spider, said extension being longitudinally bored for receiving said one of said cylinders for the purpose of guiding the spider relative to the casing, said one piston being a filler piston fixed to the spider and having a sliding fit in said one cylinder for decreasing the clearance, the filler piston having a radial bore in its inner end, and the spider having a radial bore communicating with the radial bore of said filler piston for the purpose of permitting operating fluid to escape from the bottom of the longitudinal bore in said extension to the crank pin.

LEO WIDMER.

REFERENCES CITED

The following references are of record in the file of this patent:

UNITED STATES PATENTS

| Number | Name | Date |
|---|---|---|
| 1,590,225 | Boisset | June 29, 1926 |
| 2,174,981 | Kahn | Oct. 3, 1939 |

FOREIGN PATENTS

| Number | Country | Date |
|---|---|---|
| 261,984 | Great Britain | Dec. 2, 1926 |